(12) United States Patent
Huang et al.

(10) Patent No.: US 12,581,284 B2
(45) Date of Patent: Mar. 17, 2026

(54) SYSTEMS AND METHODS FOR EXPOSING TELEMETRY INFORMATION IN CELLULAR NETWORKS

(71) Applicant: Verizon Patent and Licensing Inc., Basking Ridge, NJ (US)

(72) Inventors: Ye Huang, San Ramon, CA (US); Shamik Basu, Lake Hiawatha, NJ (US); Samita Chakrabarti, Bedminster, NJ (US); Alexander Fadeev, Summit, NJ (US); Louis Chan-Lizardo, San Ramon, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 379 days.

(21) Appl. No.: 18/470,935

(22) Filed: Sep. 20, 2023

(65) Prior Publication Data

US 2025/0097692 A1     Mar. 20, 2025

(51) Int. Cl.
*H04W 8/20* (2009.01)
*H04W 24/10* (2009.01)

(52) U.S. Cl.
CPC ............. *H04W 8/20* (2013.01); *H04W 24/10* (2013.01)

(58) Field of Classification Search
CPC ........ H04W 8/20; H04W 24/10; H04W 24/08
See application file for complete search history.

(56) References Cited

U.S. PATENT DOCUMENTS

| | | | | |
|---|---|---|---|---|
| 2012/0252518 A1* | 10/2012 | Karampatsis | ........... | H04W 4/70 455/515 |
| 2016/0262057 A1* | 9/2016 | Speicher | ............... | H04W 28/24 |
| 2018/0219959 A1* | 8/2018 | Bugenhagen | ......... | H04L 41/083 |
| 2022/0295242 A1* | 9/2022 | Taft, III | ................ | H04W 40/22 |
| 2024/0373264 A1* | 11/2024 | Lovison | ................ | H04W 24/02 |

* cited by examiner

*Primary Examiner* — Dhaval V Patel

(57) ABSTRACT

A device may include a processor configured to receive an indication from a subscriber management device that a user equipment (UE) device has attached to a second core network, wherein the device is in a core network associated with a Radio Access Network. The processor may be configured to subscribe with a second network exposure device in the second core network to receive telemetry information notifications for the UE device, in response to receiving the indication; receive a telemetry information notification for the UE device from the second network exposure device; and report telemetry information obtained from the received telemetry information notification to a server device associated with the UE device.

20 Claims, 8 Drawing Sheets

100

260/360

515

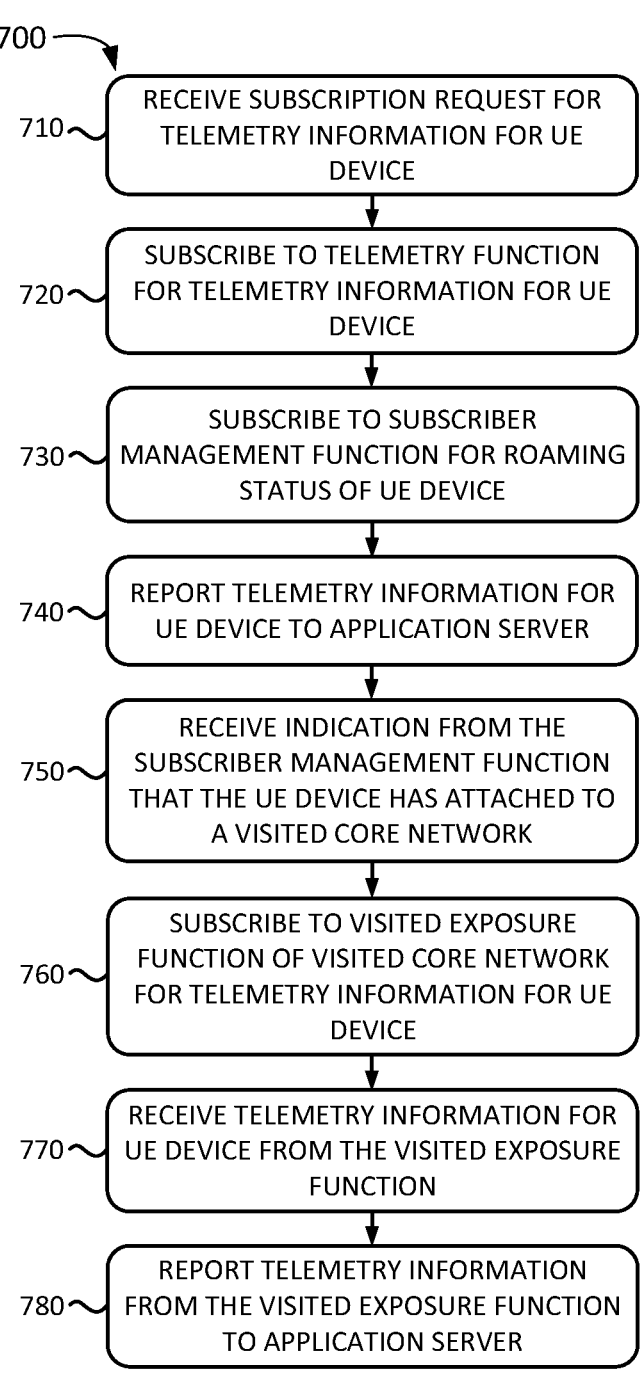

700

710 — RECEIVE SUBSCRIPTION REQUEST FOR TELEMETRY INFORMATION FOR UE DEVICE

720 — SUBSCRIBE TO TELEMETRY FUNCTION FOR TELEMETRY INFORMATION FOR UE DEVICE

730 — SUBSCRIBE TO SUBSCRIBER MANAGEMENT FUNCTION FOR ROAMING STATUS OF UE DEVICE

740 — REPORT TELEMETRY INFORMATION FOR UE DEVICE TO APPLICATION SERVER

750 — RECEIVE INDICATION FROM THE SUBSCRIBER MANAGEMENT FUNCTION THAT THE UE DEVICE HAS ATTACHED TO A VISITED CORE NETWORK

760 — SUBSCRIBE TO VISITED EXPOSURE FUNCTION OF VISITED CORE NETWORK FOR TELEMETRY INFORMATION FOR UE DEVICE

770 — RECEIVE TELEMETRY INFORMATION FOR UE DEVICE FROM THE VISITED EXPOSURE FUNCTION

780 — REPORT TELEMETRY INFORMATION FROM THE VISITED EXPOSURE FUNCTION TO APPLICATION SERVER

FIG. 7

SYSTEMS AND METHODS FOR EXPOSING TELEMETRY INFORMATION IN CELLULAR NETWORKS

BACKGROUND INFORMATION

To satisfy the needs and demands of users of mobile communication devices, providers of wireless communication services continue to improve and expand available services as well as networks used to deliver such services. One aspect of such improvements includes enabling mobile communication devices to access and use various services via the provider's communication network. For example, the provider may need to facilitate communication with other networks. Managing communication with other networks may pose various difficulties.

BRIEF DESCRIPTION OF THE DRAWINGS

FIG. 7 illustrates a flowchart of a process for exposing telemetry information according to an implementation described herein.

DETAILED DESCRIPTION OF PREFERRED EMBODIMENTS

Figure 1:
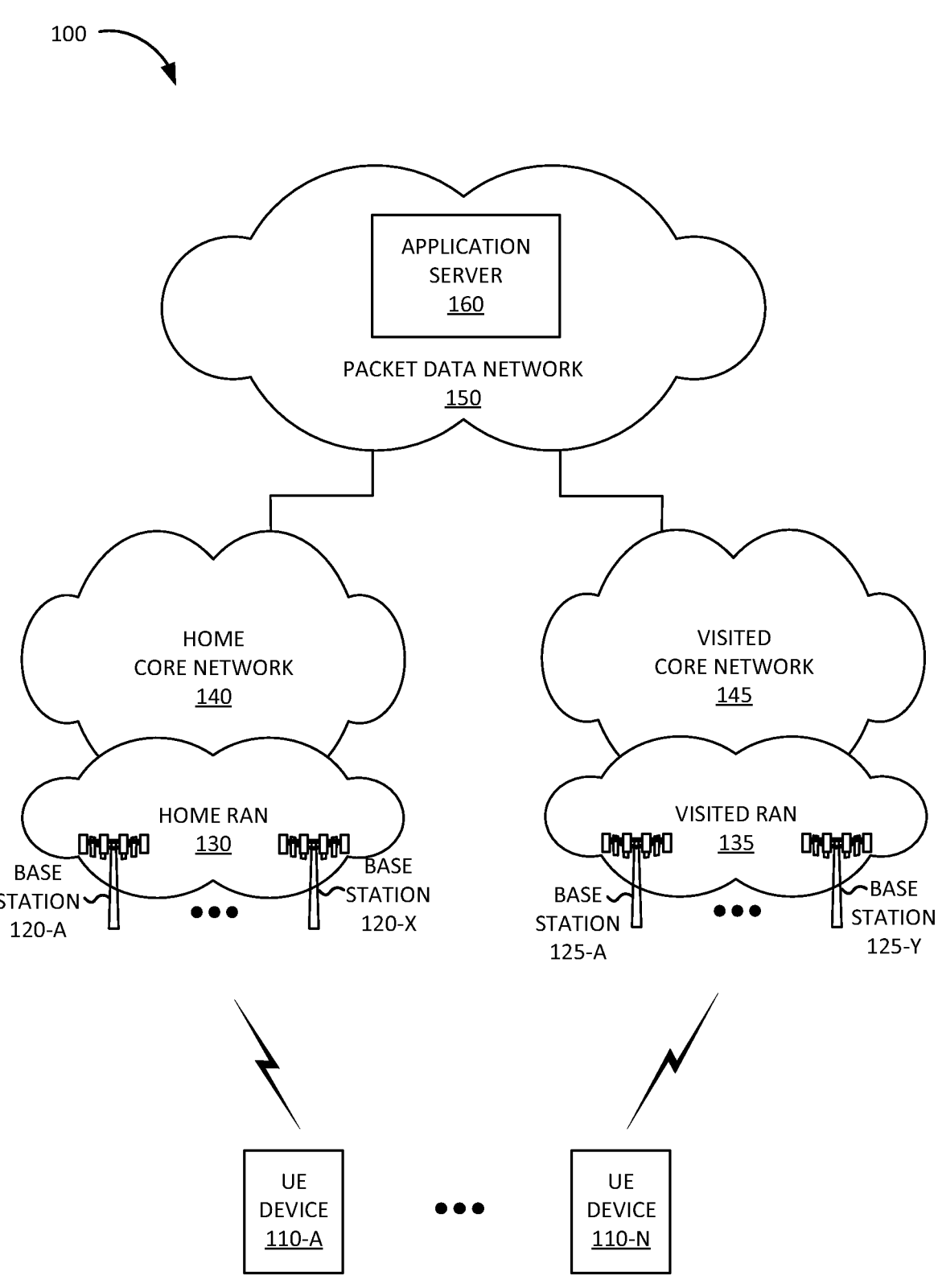
FIG. 1 illustrates an environment according to an implementation described herein.

The following detailed description refers to the accompanying drawings. The same reference numbers in different drawings identify the same or similar elements.

Providers of wireless communication services operate radio access networks (RANs) that include base stations. The base stations enable wireless communication devices (e.g., smart phones, etc.), referred to as user equipment (UE) devices, to connect to networks and obtain services via the provider's core network, such as a Fourth Generation (4G) core network and/or a Fifth Generation (5G) core network. For example, a UE device may connect to a third-party application server via an application installed on the UE device.

A UE device may be connected to a home network (e.g., a home RAN and a home core network) and the home network may be configured to collect and/or report telemetry information associated with the UE device to the application server. For example, an Internet of Things (IoT) device, such as a Narrow Band IoT (NB-IoT) device or a Category M (Cat-M) device, may need to communicate with the application server at particular intervals and the application server may need to be notified with telemetry information relating to the IoT device. The telemetry information may include, for example, information relating to the signal strength and/or signal quality associated with the IoT device, whether a connection associated with the IoT device is experiencing congestion, and/or whether the IoT device has experienced a loss of connection (LOC). The home network may be able to collect telemetry information for the IoT device and report the telemetry information to the application server.

However, the IoT device may move to an area outside the coverage of the home network and may connect to another network, referred to as a visited network. The home network may not be able to obtain or determine telemetry information for the IoT device when the IoT device loses connection to the home network.

Implementations described herein relate to systems and methods for exposing telemetry information in cellular networks. An exposure function device, in a core network associated with a RAN, may be configured to subscribe to telemetry information notifications for a UE device from a telemetry device in the core network and report information from received telemetry information notifications for the UE device to an application server associated with the UE device. The exposure function device may further subscribe to roaming and/or LOC status notifications for the UE device from a subscriber management device and report information from received roaming and/or LOC status notifications for the UE device to the application server associated with the UE device.

The exposure function device may be further configured to receive an indication from the subscriber management device that the UE device has attached to a visited core network and, in response to receiving the indication, subscribe to telemetry information notifications for the UE device from a visited network exposure device in the visited core network. The exposure function device may then receive a telemetry information notification for the UE device from the visited network exposure device and report telemetry information from the received telemetry information notification to a server device associated with the UE device.

The telemetry information may include a signal strength and/or quality parameter value for the UE device, congestion information for a connection associated with the UE device, loss of connection information for a connection associated with the UE device, and/or other types of telemetry information associated with the UE device. In some implementations, the core network may include a 4G core network and the exposure function device may include a Service Capabilities Exposure Function (SCEF) in the 4G core network. In other implementations, the core network may include a 5G core network and the exposure function device may include a Network Exposure Function (NEF). In some implementations, the visited core network may include a 4G network and the visited exposure function device may include an SCEF. In other implementations, the visited core network may include a 5G core network and the visited exposure function device may include an NEF.

FIG. 1 is a diagram of an exemplary environment 100 in which the systems and/or methods, described herein, may be implemented. As shown in FIG. 1, environment 100 may include UE devices 110-A to 110-N (referred to herein collectively as "UE devices 110" and individually as "UE device 110"), a home RAN 130 that includes base stations 120-A to 120-X (referred to herein collectively as "base stations 120" and individually as "base station 120"), a home core network 140, a visited RAN 135 that includes base stations 125-A to 125-Y, a visited core network 145, and a packet data network (PDN) 150 that includes an application server 160.

UE device 110 may include any mobile device with cellular wireless communication functionality. UE device 110 may include a handheld wireless communication device (e.g., a mobile phone, a smart phone, a tablet device, etc.); a wearable computer device (e.g., a head-mounted display computer device, a wristwatch computer device, etc.); a laptop computer, a tablet computer, or another type of portable computer; a WiFi access point (AP), a portable gaming system; and/or any other type of mobile computer device with cellular wireless communication capabilities. In some implementations, UE device 110 may communicate using machine-to-machine (M2M) communication, such as Machine Type Communication (MTC), and/or another type of M2M communication for IoT applications.

Base station 120/125 may include a 5G New Radio (NR) base station (e.g., a gNodeB) and/or a Fourth Generation (4G) Long Term Evolution (LTE) base station (e.g., an eNodeB). Each base station 120/125 may include devices and/or components configured to enable cellular wireless communication with UE devices 110. For example, base station 120/125 may include a radio frequency (RF) transceiver configured to communicate with UE devices using a 5G NR air interface using a 5G NR protocol stack, a 4G LTE air interface using a 4G LTE protocol stack, and/or using another type of cellular air interface.

Home RAN 130 may include base stations 120 and be managed by a provider of wireless communication services. Home RAN 130 may enable UE devices 110 to connect to core network 140 via base stations 120 using cellular wireless signals. For example, home RAN 130 may include one or more central units (CUs), distributed units (DUs), and/or Radio Units (RUS) (not shown in FIG. 1) that enable and manage connections from RUs to home core network 140. Home RAN 130 may include features associated with an LTE Advanced (LTE-A) network and/or a 5G core network or other advanced network, such as management of 5G NR base stations; carrier aggregation; advanced or massive multiple-input and multiple-output (MIMO) configurations (e.g., an 8×8 antenna configuration, a 16×16 antenna configuration, a 256×256 antenna configuration, etc.); cooperative MIMO (CO-MIMO); relay stations; Heterogeneous Networks (HetNets) of overlapping small cells and macrocells; Self-Organizing Network (SON) functionality; MTC functionality, such as 1.4 Megahertz (MHz) wide enhanced MTC (eMTC) channels (also referred to as category Cat-M1), Low Power Wide Area (LPWA) technology such as Narrow Band (NB) IoT (NB-IoT) technology, and/or other types of MTC technology; and/or other types of LTE-A and/or 5G functionality.

Home core network 140 may be managed by the provider of cellular wireless communication services and may manage communication sessions of subscribers connecting to home core network 140 via home RAN 130. For example, home core network 140 may establish an Internet Protocol (IP) connection between UE devices 110 and PDN 150. In some implementations, home core network 140 may include a 4G core network. Exemplary components of a 4G core network are described below with reference to FIG. 2. In other implementations, home core network 140 may include a 5G core network. Exemplary components of a 5G core network are described below with reference to FIG. 3.

The components of home core network 140 may be implemented as dedicated hardware components and/or as Virtualized Network Functions (VNFs) implemented on top of a common shared physical infrastructure. For example, a VNF may be implemented using a VNF virtual machine, a Cloud-Native Network Function (CNF) container, an event driven serverless architecture interface, and/or another type of VNF architecture. The common shared physical infrastructure may be implemented using one or more devices 400 described below with reference to FIG. 4 in a cloud computing center associated with core network 140. Additionally, or alternatively, some, or all, of the common shared physical infrastructure may be implemented using one or more devices 400 included in a Multi-Access Edge Computing (MEC) network associated with home RAN 130.

Visited RAN 135 and/or visited core network 145 may be used by UE device 110 when UE device 110 is out of the coverage area of home RAN 130. UE device 110 may attach to, and/or register with, visited core network 145 via visited RAN 135 when UE device 110 leaves the coverage area of home RAN 130 and enters the coverage area for visited RAN 135. Visited RAN 135 may have components and functionality similar to what is described above for home RAN 130. Visited core network 145 may have components and functionality similar to what is described above for home core network 135. Visited RAN 135 and/or visited core network 145 may be managed by a different provider than the provider managing home RAN 130 and home core network 140; and home core network 140 may have a Public Land Mobile Network (PLMN) identifier (ID) different from the PLMN ID of visited core network 145. Home RAN 130 may be configured to communicate with visited RAN 135 to perform handovers of UE device 110. Furthermore, home core network 140 may be configured to communicate with visited core network 145 to manage communication services for UE device 110 and/or to obtain telemetry information for UE device 110 from visited core network 145. While FIG. 1 shows a single visited RAN 135 and a single visited core network 145 for illustrative purposes, in practice, environment 100 may include multiple visited RANs 135 and/or visited core networks 145.

PDN 150 may be associated with an Access Point Name (APN) and/or Data Network Name (DNN) and UE device 110 may request a connection to PDN 150 using the APN or DNN. PDN 150 may include, and/or be connected to and enable communication with, a local area network (LAN), a wide area network (WAN), a metropolitan area network (MAN), an autonomous system (AS) on the Internet, an optical network, a cable television network, a satellite network, a wireless network, an ad hoc network, a telephone network (e.g., the Public Switched Telephone Network (PSTN) or a cellular network), an intranet, or a combination of networks.

Application server 160 may include one or more computer devices that host one or more applications used by UE device 110 and/or provides another type of service to UE device 110. For example, application server 160 may host video and/or audio content and may stream video and/or audio to UE device 110, may host a game played by the user of UE device 110, may provide cloud computing services to UE device 110, may host a social media or another type of website, and/or may host another type of application and/or provide another type of service. Application server 160 may subscribe to receive telemetry information associated with UE device 110 from a network exposure device, such as an SCEF and/or NEF device, in home core network 140.

Although FIG. 1 shows exemplary components of environment 100, in other implementations, environment 100 may include fewer components, different components, differently arranged components, or additional components than depicted in FIG. 1. Additionally, or alternatively, one or more components of environment 100 may perform functions described as being performed by one or more other components of environment 100.

Figure 2:
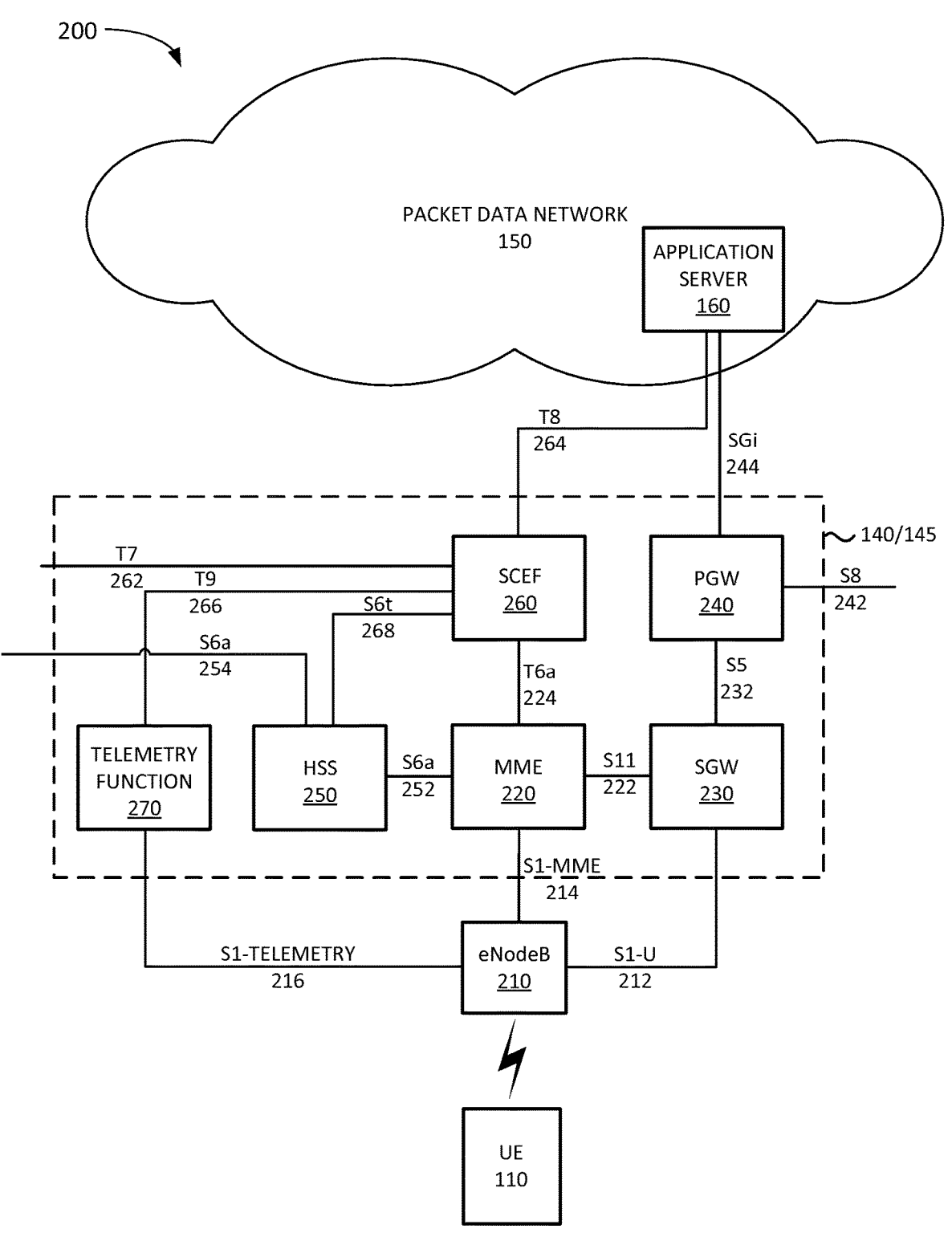
FIG. 2 illustrates exemplary components of a core network according to an implementation described herein.

FIG. 2 is a diagram illustrating an implementation 200 of home core network 140 (or visited core network 145) as a 4G core network. As shown in FIG. 2, implementation 200 includes UE device 110, eNodeB 210, home core network 140 (or visited core network 145), and PDN 150. Home core network 140 (and/or visited core network 145) may include eNodeB 210 (corresponding to base station 120 or 125), a mobility management entity (MME) 220, a serving gateway (SGW) 230, a PGW 240, a home subscriber server (HSS) 250, a SCEF 260, and a telemetry function 270. While FIG. 2 depicts a single eNodeB 210, MME 220, SGW 230, PGW 240, HSS 250, SCEF 260, and telemetry function 270 for illustration purposes, in practice, home core network 140 and/or visited core network 145 of FIG. 2 may include multiple eNodeBs 210, MMEs 220, SGWs 230, PGWs 240, HSS 250, SCEFs 260, and/or telemetry functions 270.

eNodeB 210 may correspond to base station 120 or 125. eNodeB 210 may interface with home core network 140 or visited core network 145 via an interface referred to as an S1 interface, which may be split into a data plane S1-U interface 212 and a control plane S1-MME interface 214. S1-U interface 212 may interface with SGW 230 and may be implemented, for example, using General Packet Radio Service (GPRS) Tunneling Protocol version 2 (GTPv2). S1-MME interface 214 may interface with MME 220 and be implemented, for example, with a protocol stack that includes a Network Access Server (NAS) protocol and/or Stream Control Transmission Protocol (SCTP).

MME 220 may implement control plane processing for core network 140. For example, MME 220 may implement tracking and paging procedures for UE device 110, may activate and deactivate bearers for UE device 110, may authenticate a user of UE device 110, and may interface to other radio access networks. A bearer may represent a logical channel with particular quality of service (QOS) requirements. MME 220 may also select a particular SGW 230 for a particular UE device 110. A particular MME 220 may interface with other MMEs 220 in home core network 140 or visited core network 145 and may send and receive information associated with UE devices 110, which may allow one MME 220 to take over control plane processing of UE devices serviced by another MME 220, if the other MME 220 becomes unavailable. MME 220 may interface with SGW 230 through an S11 interface 222 implemented using GTPv2. S11 interface 222 may be used to create and manage a new session for a particular UE device 110 and activated when MME 220 needs to communicate with SGW 230, such as when the particular UE device 110 attaches to core network 140, when bearers need to be added or modified for an existing session for the particular UE device 110, when a connection to a new PGW 240 needs to be created, or during a handover procedure (e.g., when the particular UE device 110 needs to switch to a different SGW 230).

SGW 230 may provide an access point to and from UE device 110, may handle forwarding of data packets for UE device 110, and may act as a local anchor point during handover procedures between eNodeBs 210. SGW 230 may interface with PGW 240 through an S5 interface 232 that is implemented, for example, using GTPv2. PGW 240 may function as a gateway to PDN 150 through an SGi interface 244. A particular UE device 110, while connected to a single SGW 230, may be connected to multiple PGWs 240, one for each packet network with which UE device 110 communicates. For example, a particular PGW 240 may be associated with a particular APN or DNN and UE device 110 may connect to the particular APN by connecting to the PGW 240 associated with the particular APN. PGW 240 in home core network 140 may interface with SGW 230 in visited core network 145 through an S8 interface 242 that is implemented, for example, using GTPv2.

HSS 250 may store information associated with UE devices 110 and/or information associated with users of UE devices 110. For example, HSS 250 may store subscription profiles that include authentication and access authorization information. Each subscription profile may include a list of UE devices 110 associated with the subscription as well as an indication of which UE device 110 is active (e. g., authorized to connect to core network 140). Additionally, the subscription profile may store information from location updates for UE device 110 indicating a current or last known location for UE device 110 and/or a network to which UE device 110 is connected (e.g., home core network 140, visited core network 145, etc.). MME 220 may communicate with HSS 250 through an S6a interface 252 that is implemented, for example, using a Diameter protocol. HSS 250 may communicate with another MME 220 in visited core network 145 through an S6a interface 254 that is implemented, for example, using a Diameter protocol. HSS 250 may receive information via S6a interface 254 identifying visited core network 145 when UE device 110 attaches to visited core network 145.

SCEF 260 may expose the services and/or capabilities of home core network 140 and/or home RAN 130 (or visited RAN 135 and/or visited core network 145) to application server 160. For example, application server 160 may use an API to subscribe for telemetry information relating to UE device 110. SCEF 260 may subscribe for telemetry information for UE device 110 from telemetry function 270. Furthermore, SCEF 260 may subscribe for roaming and/or LOC status for UE device 110 from HSS 250. Moreover, SCEF 260 may subscribe for telemetry information for UE device 110 from another SCEF 260 in visited core network 145 in response to receiving a notification from HSS 250 that UE device 110 has attached to visited core network 145. SCEF 260 may report telemetry, congestion, and roaming and/or LOC status information to application server 160.

SCEF 260 may communicate with application server 160 through a T8 interface that is implemented, for example, using Hypertext Transfer Protocol (HTTP). SCEF may communicate with MME 220 using a T6a interface 224. SCEF may communicate with another SCEF 260 in visited core network 145 using a T7 interface 262. SCEF may communicate with telemetry function 270 using a T9 interface 266. SCEF may communicate with HSS 250 using an S6t interface 268. T6a interface 224, T7 interface 262, T9 interface 266, and S6t interface 268 may be implemented using a Diameter protocol.

Telemetry function 270 may collect telemetry information for UE device 110. For example, telemetry function 270 may obtain telemetry information relating to home RAN 130 (or visited RAN 135) from eNodeB 210 via a S1-telemetry interface 216. Telemetry function 270 may provide collected telemetry information relating to UE device 110 to SCEF 260. Telemetry function 270 may obtain key performance indicator (KPI) values relating to wireless signal strength and/or quality, such as, for example, values for Reference Signal Received Power (RSRP), Reference Signal Received Quality (RSRQ), Received Signal Strength Indicator (RSSI), Signal to Interference and Noise Ratio (SINR), Channel Quality Information (CQI), Block Error Rate (BLER), and/or another KPI indicative of signal strength and/or quality value.

Furthermore, telemetry function 270 may obtain KPI values relating to throughput and/or load for base station 120 or 125 servicing UE device 110, such as, for example, downlink average throughput, downlink maximum throughput, uplink average throughput, uplink maximum throughput, physical resource block (PRB) utilization rate, average processor load, average number of users, maximum number of users, a number of voice bearers, a number of video bearers, and/or another KPI indicative of throughput and/or load. Telemetry function 270 may determine a degree of congestion and/or whether to activate a congestion alert for UE device 110 based on the obtained KPI values relating to throughput and/or load for base station 120 servicing UE device 110.

Moreover, telemetry function 270 may obtain information relating to LOC for UE device 110. For example, if base station 120 is not able to reach UE device 110, telemetry function 270 may generate a LOC alert for UE device 110. Additionally, telemetry function 270 may obtain values for other types of KPIs for base station 120 or 125 servicing UE device 110, such as, for example, latency KPIs, accessibility KPIs (e.g., a Radio Resource Control (RRC) connection setup success rate, a Radio Access Bearer (RAB) success rate, etc.), retainability KPIs (e.g., a call drop rate, etc.), mobility KPIs (e.g., a handover success rate, etc.), and/or other types of wireless network KPIs.

Although FIG. 2 shows exemplary components of home core network 140 or visited core network 145, in other implementations, home core network 140 or visited core network 145 may include fewer components, different components, differently arranged components, or additional components than depicted in FIG. 2. Additionally, or alternatively, one or more components of home core network 140 or visited core network 145 may perform functions described as being performed by one or more other components of home core network 140 or visited core network 145.

Figure 3:
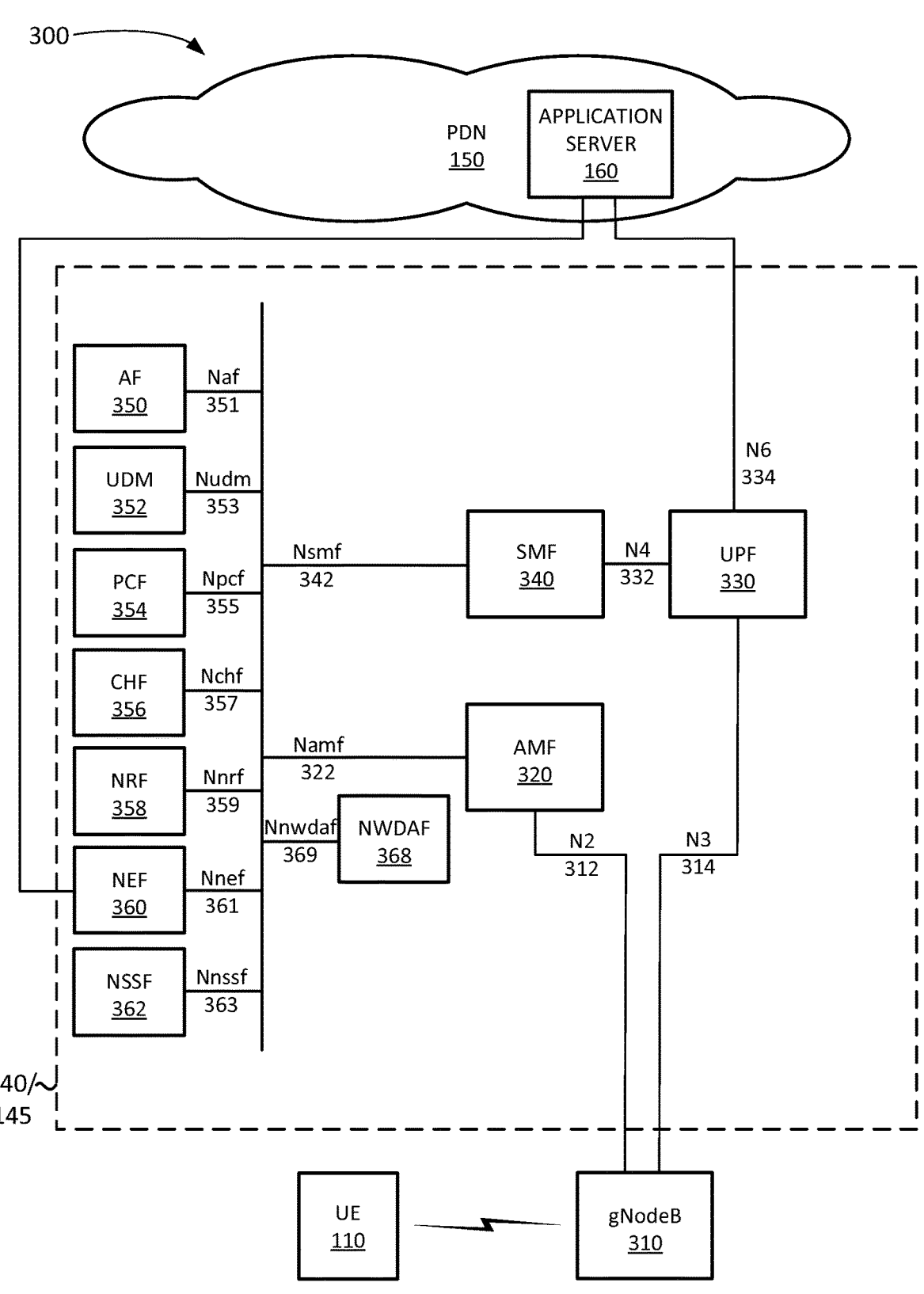
FIG. 3 illustrates exemplary components of a core network according to another implementation described herein.

FIG. 3 illustrates an implementation 300 of home core network 140 (or visited core network 145) as a 5G core network. As shown in FIG. 3, implementation 300 includes UE device 110, gNodeB 310, home core network 140 (or visited core network 145), and PDN 150. Core network 140 may include an Access and Mobility Function (AMF) 320, a User Plane Function (UPF) 330, a Session Management Function (SMF) 340, an Application Function (AF) 350, a Unified Data Management (UDM) 352, a Policy Control Function (PCF) 354, a Charging Function (CHF) 356, a Network Repository Function (NRF) 358, a Network Exposure Function (NEF) 360, a Network Slice Selection Function (NSSF) 362, and a Network Data Analytics Function (NWDAF) 368.

While FIG. 3 depicts a single AMF 320, UPF 330, SMF 340, AF 350, UDM 352, PCF 354, CHF 356, NRF 358, NEF 360, NSSF 362, and NWDAF 368 for illustration purposes, in practice, core network 301 may include multiple AMFs 320, UPFs 330, SMFs 340, AFs 350, UDMs 352, PCFs 354, CHFs 356, NRFs 358, NEFs 360, NSSFs 362, and/or NWDAFs 368. gNodeB 310 may be part of home RAN 130 or visited RAN 135 and may include base station 120 or 125. Exemplary components of gNodeB 310 are describe below with reference to FIG. 3.

AMF 320 may perform registration management, connection management, reachability management, mobility management, lawful intercepts, Short Message Service (SMS) transport between UE device 110 and SMSF 370, session management messages transport between UE device 110 and SMF 340, access authentication and authorization, location services management, functionality to support non-3GPP access networks, and/or other types of management processes. AMF 320 may be accessible by other function nodes via an Namf interface 322.

UPF 330 may maintain an anchor point for intra/inter-RAT mobility, maintain an external Packet Data Unit (PDU) point of interconnect to a particular PDN 150, perform packet routing and forwarding, perform the user plane part of policy rule enforcement, perform packet inspection, perform lawful intercept, perform traffic usage reporting, perform QoS handling in the user plane, perform uplink traffic verification, perform transport level packet marking, perform downlink packet buffering, forward an "end marker" to a RAN node (e.g., gNodeB 310), and/or perform other types of user plane processes. UPF 330 may communicate with SMF 340 using an N4 interface 332 and connect to PDN 150 using an N6 interface 334.

SMF 340 may perform session establishment, session modification, and/or session release, perform IP address allocation and management, perform Dynamic Host Configuration Protocol (DHCP) functions, perform selection and control of UPF 330, configure traffic steering at UPF 330 to guide the traffic to the correct destinations, terminate interfaces toward PCF 354, perform lawful intercepts, charge data collection, support charging interfaces, control and coordinate of charging data collection, terminate session management parts of Non-Access Stratum messages, perform downlink data notification, manage roaming functionality, and/or perform other types of control plane processes for managing user plane data. SMF 340 may be accessible via an Nsmf interface 342.

AF 350 may provide services associated with a particular application, such as, for example, an application for influencing traffic routing, an application for accessing NEF 360, an application for interacting with a policy framework for policy control, and/or other types of applications. AF 350 may be accessible via an Naf interface 351, also referred to as an NG5 interface. In some implementations, AF 350 may correspond to, or interface with, application server 160.

UDM 352 may maintain subscription information for UE devices 110, manage subscriptions, generate authentication credentials, handle user identification, perform access authorization based on subscription data, maintain service and/or session continuity by maintaining assignment of SMF 340 for ongoing sessions, support SMS delivery, support lawful intercept functionality, and/or perform other processes associated with managing user data. UDM 352 may interface with a Unified Data Repository (UDR) that stores, in a subscription profile associated with a particular UE device 110, a list of network slices which the particular UE device 110 is allowed to access. Additionally, the subscription profile may store information from location updates for UE device 110 indicating a current or last known location for UE device 110 and/or a network to which UE device 110 is connected (e.g., home core network 140, visited core network 145, etc.). When UE device 110 attaches to visited core network 145, UDM 352 may receive, from a visited AMF 320 in visited core network 145, information identifying visited core network 145. UDM 352 may be accessible via a Nudm interface 353.

PCF 354 may support policies to control network behavior, provide policy rules to control plane functions (e.g., to SMF 340), access subscription information relevant to policy decisions, perform policy decisions, and/or perform other types of processes associated with policy enforcement.

PCF 354 may be accessible via Npcf interface 355. CHF 356 may perform charging and/or billing functions for core network 140. CHF 356 may be accessible via Nchf interface 357.

NRF 358 may support a service discovery function and maintain profiles of available network function (NF) instances and their supported services. An NF profile may include an NF ID, an NF type, a PLMN ID associated with the NF, network slice IDs associated with the NF, capacity information for the NF, service authorization information for the NF, supported services associated with the NF, endpoint information for each supported service associated with the NF, and/or other types of NF information. NRF 358 may be accessible via an Nnrf interface 359.

NEF 360 may expose services, capabilities, and/or events to other NFs, including third party NFs, AFs, edge computing NFs, and/or other types of NFs. Furthermore, NEF 360 may secure provisioning of information from external applications to home core network 140 (or visited core network 145), translate information between home core network 140 (or visited core network 145) and devices/networks external to home core network 140 (or visited core network 145), support a Packet Flow Description (PFD) function, and/or perform other types of network exposure functions.

Application server 160 may use an API to subscribe to NEF 360 for telemetry information relating to UE device 110. NEF 360 may subscribe for telemetry information for UE device 110 from NWDAF 368. Furthermore, NEF 360 may subscribe for roaming and/or LOC status for UE device 110 from UDM 352 via Nudm interface 353. Moreover, NEF 360 may subscribe, via Nnef interface 361, for telemetry information for UE device 110 from another NEF 360 in visited core network 145 in response to receiving a notification from UDM 352 that UE device 110 has attached to visited core network 145. NEF 360 may report telemetry, congestion, and roaming and/or LOC status information to application server 160 (e.g., via HTTP, etc.).

NSSF 362 may select a set of network slice instances to serve a particular UE device 110, determine network slice selection assistance information (NSSAI), determine a particular AMF 320 to serve a particular UE device 110, and/or perform other types of processing associated with network slice selection or management. NSSF 362 may provide a list of allowed slices for a particular UE device 110 to UDM 352 to store in a subscription profile associated with the particular UE device 110. NSSF 362 may be accessible via Nnssf interface 363.

NWDAF 368 may collect analytics information associated with radio access network 130 and/or core network 140. For example, NWDAF 368 may obtain telemetry information relating to home RAN 130 (or visited RAN 135) from eNodeB 210 and provide collected telemetry information relating to UE device 110 to NEF 360. NWDAF 268 may obtain KPI values relating to wireless signal strength and/or quality, relating to throughput and/or load for base station 120 servicing UE device 110, relating to LOC for UE device 110, and/or other types of KPIs for base station 120/125 servicing UE device 110, such as KPIs described above with reference to SCEF 260 of FIG. 2. NWDAF 368 may determine a degree of congestion and/or whether to activate a congestion alert for UE device 110 based on the obtained KPI values relating throughput and/or load for base station 120/125 servicing UE device 110.

Although FIG. 3 shows exemplary components of home core network 140 (or visited core network 145), in other implementations, home core network 140 (or visited core network 145) may include fewer components, different components, differently arranged components, or additional components than depicted in FIG. 3. Additionally, or alternatively, one or more components of home core network 140 (or visited core network 145) may perform functions described as being performed by one or more other components of home core network 140 (or visited core network 145). Furthermore, while particular interfaces have been described with respect to particular function nodes in FIG. 3, additionally, or alternatively, home core network 140 (or visited core network 145) may include a reference point architecture that includes point-to-point interfaces between particular function nodes.

Figure 4:
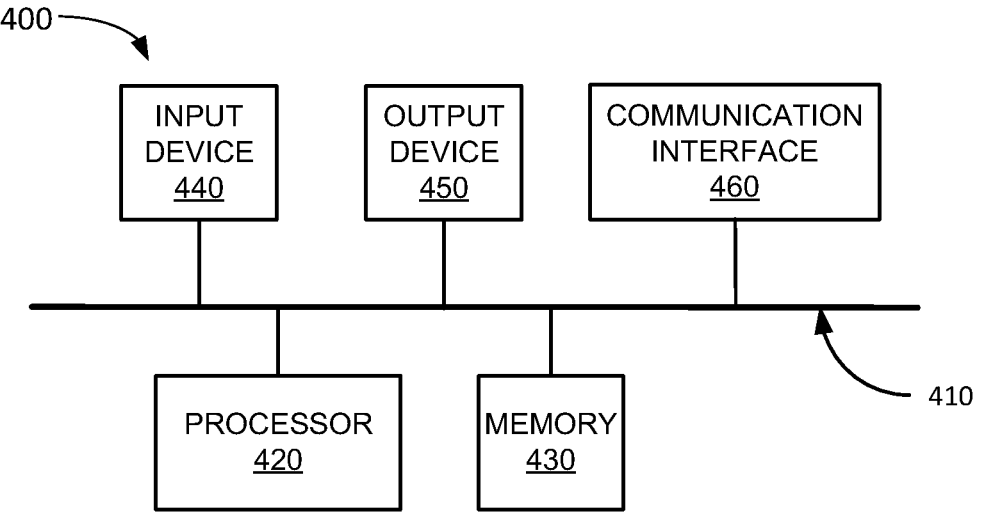
FIG. 4 illustrates exemplary components of a device that may be included in network components according to an implementation described herein.

FIG. 4 is a diagram illustrating example components of a device 400 according to an implementation described herein. Each of the components of FIGS. 1, 2, and/or 3 may include, or be implemented on, one or more devices 400. As shown in FIG. 4, device 400 may include a bus 410, a processor 420, a memory 430, an input device 440, an output device 450, and a communication interface 460.

Bus 410 may include a path that permits communication among the components of device 400. Processor 420 may include any type of single-core processor, multi-core processor, microprocessor, latch-based processor, central processing unit (CPU), graphics processing unit (GPU), tensor processing unit (TPU), hardware accelerator, and/or processing logic (or families of processors, microprocessors, and/or processing logics) that interprets and executes instructions. In other embodiments, processor 420 may include an application-specific integrated circuit (ASIC), a field-programmable gate array (FPGA), and/or another type of integrated circuit or processing logic.

Memory 430 may include any type of dynamic storage device that may store information and/or instructions, for execution by processor 420, and/or any type of non-volatile storage device that may store information for use by processor 420. For example, memory 430 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 440 may allow an operator to input information into device 400. Input device 440 may include, for example, a keyboard, a mouse, a pen, a microphone, a remote control, an audio capture device, an image and/or video capture device, a touch-screen display, and/or another type of input device. In some implementations, device 400 may be managed remotely and may not include input device 440. In other words, device 400 may be "headless" and may not include a keyboard, for example.

Output device 450 may output information to an operator of device 400. Output device 450 may include a display, a printer, a speaker, and/or another type of output device. For example, device 400 may include a display, which may include a liquid-crystal display (LCD) for displaying content to the user. In some implementations, device 400 may be managed remotely and may not include output device 450. In other words, device 400 may be "headless" and may not include a display, for example.

Communication interface 460 may include a transceiver that enables device 400 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 460 may include a transmitter that converts baseband signals to radio frequency (RF) signals and/or a receiver that converts RF signals to baseband signals. Communication interface 460 may be coupled to an antenna for transmitting and receiving RF signals.

Communication interface 460 may include a logical component that includes input and/or output ports, input and/or output systems, and/or other input and output components that facilitate the transmission of data to other devices. For example, communication interface 460 may include a network interface card (e.g., Ethernet card) for wired communications and/or a wireless network interface (e.g., a WiFi) card for wireless communications. Communication interface 460 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, device 400 may perform certain operations relating to exposure-function-based telemetry information for UE devices 110. Device 400 may perform these operations in response to processor 420 executing software instructions contained in a computer-readable medium, such as memory 430. A computer-readable medium may be defined as a non-transitory memory device. A memory device may be implemented within a single physical memory device or spread across multiple physical memory devices. The software instructions may be read into memory 430 from another computer-readable medium or from another device. The software instructions contained in memory 430 may cause processor 420 to perform processes described herein. Alternatively, hard-wired circuitry may be used in place of, or in combination with, software instructions to implement processes described herein. Thus, implementations described herein are not limited to any specific combination of hardware circuitry and software.

Although FIG. 4 shows exemplary components of device 400, in other implementations, device 400 may include fewer components, different components, additional components, or differently arranged components than depicted in FIG. 4. Additionally, or alternatively, one or more components of device 400 may perform one or more tasks described as being performed by one or more other components of device 400.

Figure 5:
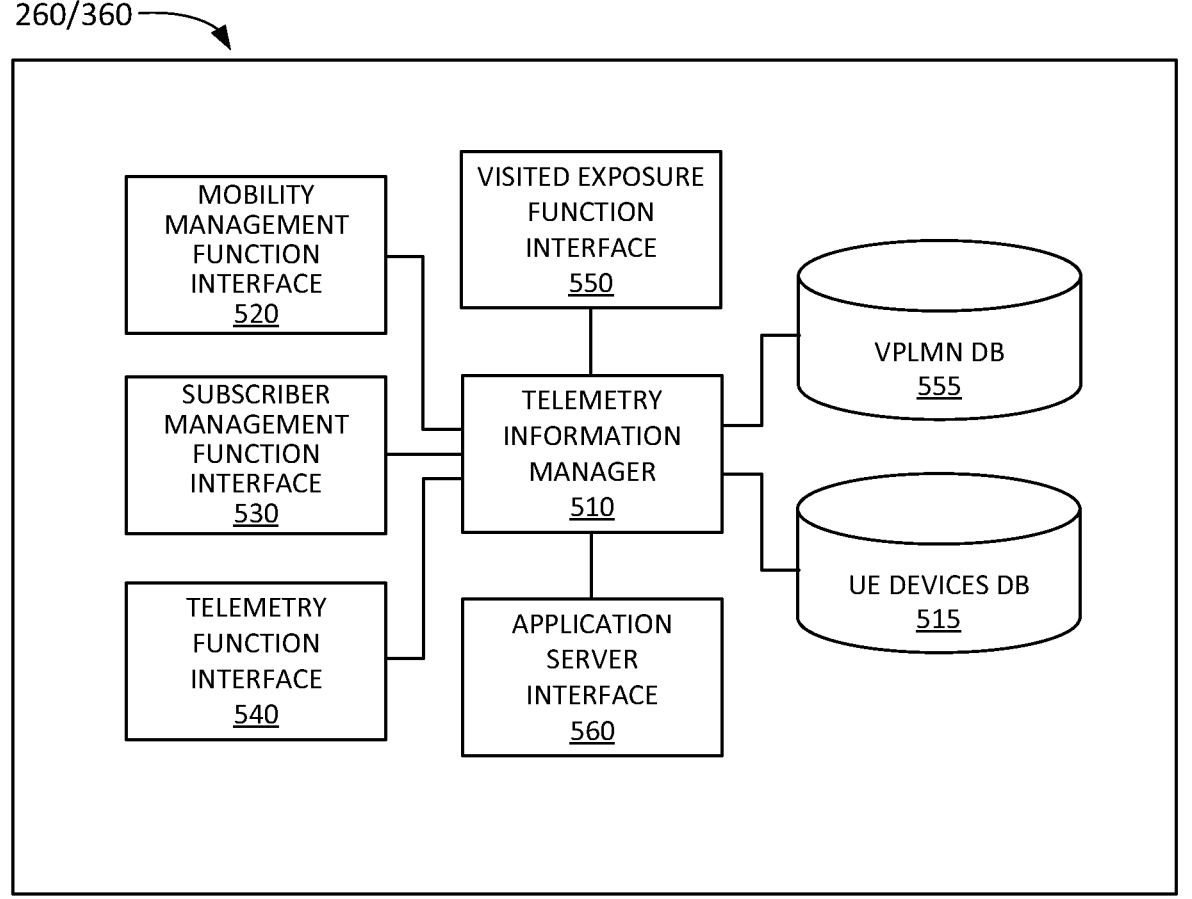
FIG. 5 illustrates exemplary components of a network exposure device according to an implementation described herein.

FIG. 5 is a diagram illustrating exemplary components of SCEF 260 or NEF 360. The components of SCEF 260 or NEF 360 may be implemented, for example, via processor 420 executing instructions from memory 430. Alternatively, some or all of the components of SCEF 260 or NEF 360 may be implemented via hard-wired circuitry. As shown in FIG. 5, SCEF 260 or NEF 360 may include a telemetry information manager 510, a UE devices database (DB) 515, a mobility management function interface 520, a subscriber management function interface 530, a telemetry function interface 540, a visited exposure function interface 550, a Visited PLMN (VPLMN) DB 555, and an application server interface 560.

Telemetry information manager 510 may manage telemetry information for UE devices 110 for which application server 160 has requested telemetry information. Telemetry information manager 510 may receive a subscription request for telemetry information for UE device 110 from application server 160. In response, telemetry information manager

510 may generate a new UE device record in UE devices DB 515. UE devices DB 515 may store telemetry information for UE devices 110. Exemplary information that may be stored in UE devices DB 515 is described below with reference to FIG. 6.

Telemetry information manager 510 may send a subscription request for telemetry information for UE device 110 to a telemetry function using telemetry function interface 540 and send a subscription request for roaming and/or LOC status updates for UE device 110 to a subscription management function using subscriber management function interface 530. Telemetry information manager 510 may receive telemetry, congestion, and/or roaming and/or LOC status updates for UE device 110, store the received information in UE devices DB 515, and report the received information to application server 160.

Furthermore, if telemetry information manager 510 receives an indication from a subscription management function (and/or from a mobility management function) that UE device 110 has attached to, or registered with, visited core network 145, telemetry information manager 510 may identify visited core network 145 based on a VPLMN ID received from the subscription management function (and/or from the mobility management function), and send a subscription request for telemetry information for UE device 110 to a visited exposure function in visited core network 145 based on information stored in VPLMN DB 555. VPLMN DB 555 may store a list of visited core networks 145 and, for each visited core network 145, may store an address (e.g., an IP address, etc.) for a visited exposure function (e.g., a visited SCEF 260, a visited NEF 360, etc.). Telemetry information manager 510 may receive telemetry, congestion, and/or roaming and/or LOC status updates for UE device 110 from the visited telemetry function, store the received information in UE devices DB 515, and report the received information to application server 160.

Mobility management function interface 520 may interface with a mobility management function, such as MME 220 or AMF 320. For example, mobility management function interface 520 may be configured to use T6a interface 224 and/or Namf interface 322. Mobility management function interface 520 may be notified by MME 220 or AMF 320 when UE device 110 attaches to, or registers with, home core network 140. Furthermore, in some implementations, mobility management function interface 520 may be notified by MME 220 or AMF 320 when a LOC occurs for UE device 110.

Subscriber management function interface 530 may interface with a subscriber management function, such as HSS 250 and/or UDM 352. For example, subscriber management function interface 530 may be configured to use S6t interface 268 and/or Nudm interface 353 to subscribe to notifications of updates to roaming and/or LOC status for UE device 110 and/or to receive notifications of updates to roaming and/or LOC status for UE device 110 from HSS 250 and/or UDM 352.

Telemetry function interface 540 may interface with a telemetry function. For example, telemetry function interface 540 may be configured to use T9 interface 266 and/or Nnwdaf interface 369 to subscribe to telemetry reports for UE device 110 and/or to receive telemetry reports for UE device 110 from telemetry function 270 and/or NWDAF 368.

Visited exposure function interface 550 may interface with a visited exposure function. For example, visited exposure function interface 550 may be configured to use T7 interface 262 and/or Nnef interface 361 to subscribe to telemetry reports, congestion reports, and/or LOC reports for UE device 110, and/or to receive telemetry reports, congestion reports, and/or LOC reports for UE device 110 from a visited SCEF 260 and/or a visited NEF 360 in visited core network 145.

Application server interface 560 may be configured to communicate with application server 160. For example, application server interface 560 may be configured to provide a T8 interface 262 and/or Nnef interface 361 to enable application server 160 to subscribe to telemetry reports, congestion reports, and/or LOC reports for UE device 110, and/or to send telemetry reports, congestion reports, and/or LOC reports for UE device 110 to application server 160 based on a received subscription.

Although FIG. 5 shows exemplary components of SCEF 260 or NEF 360, in other implementations, SCEF 260 or NEF 360 may include fewer components, different components, additional components, or differently arranged components than depicted in FIG. 5. Additionally, or alternatively, one or more components of SCEF 260 or NEF 360 may perform one or more tasks described as being performed by one or more other components of SCEF 260 or NEF 360.

Figure 6:
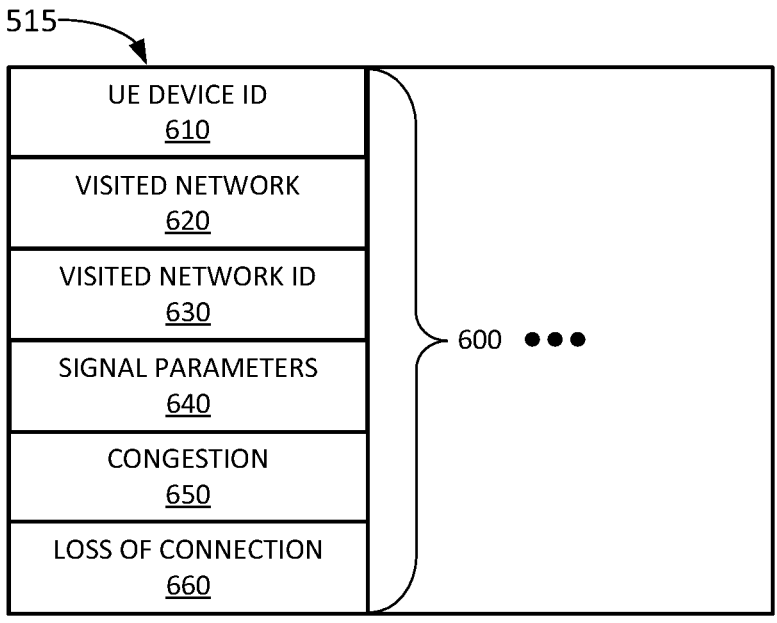
FIG. 6 illustrates exemplary components of a user equipment devices database according to an implementation described herein.

FIG. 6 illustrates exemplary components of UE devices DB 515. As shown in FIG. 6, UE devices DB 515 may include one or more UE device records 600. Each UE device record 600 may store information relating to a particular UE device 110. UE device record 600 may include a UE device ID field 610, a visited network field 620, a visited network ID field 630, a signal parameters field 640, a congestion field 650, and a LOC field 660.

UE device ID field 610 may store information identifying a particular UE device 110. For example, UE device ID field 610 may store a Mobile Directory Number (MDN), an International Mobile Subscriber Identity (IMSI), a Mobile Station International Subscriber Directory Number (MSISDN), an International Mobile Equipment Identity (IMEI), an ID associated with the subscription for UE device 110 (e.g., a subscription ID, an account number, etc.), and/or another type of ID for the particular UE device 110.

Visited network field 620 may store information identifying whether the particular UE device 110 is attached to, or registered with, visited core network 145. Visited network ID field 630 may store a VPLMN ID for visited core network 145 if the particular UE device 110 is attached to, or registered with, visited core network 145.

Signal parameters field 640 may store values for signal strength and/or signal quality obtained from a telemetry function (e.g., from telemetry function 270 and/or from NWDAF 368), such as, for example, values for RSRP, RSRQ, RSSI, SINR, CQI, BLER, and/or another KPI indicative of signal strength and/or quality value.

Congestion field 650 may store information indicating whether a congestion alert has been received for the particular UE device 110 from the telemetry function (e.g., from telemetry function 270 and/or from NWDAF 368). Furthermore, congestion field 650 may store one or more values for KPIs associated with a measure of congestion, such as, for example, downlink average throughput, downlink maximum throughput, uplink average throughput, uplink maximum throughput, PRB utilization rate, average processor load, average number of users, maximum number of users, a number of voice bearers, a number of video bearers, and/or another KPI indicative of throughput and/or load. LOC field 660 may store information indicating whether the particular UE device 110 is roaming and/or has experienced LOC.

Although FIG. 6 shows exemplary components of UE devices DB 515, in other implementations, UE devices DB 515 may include fewer components, different components, additional components, or differently arranged components than depicted in FIG. 6.

FIG. 7 illustrates a flowchart of a process 700 for exposing telemetry information according to an implementation described herein. In some implementations, process 700 of FIG. 7 may be performed by SCEF 260 or NEF 360. In other implementations, some or all of process 700 may be performed by another device or a group of devices separate from SCEF 260 or NEF 360.

As shown in FIG. 7, process 700 may include receiving a subscription request for telemetry information for a UE device (block 710), subscribing to a telemetry function for telemetry information for the UE device (block 720), and subscribing to a subscriber management function for roaming status for UE device (block 730). For example, SCEF 260 or NEF 360 may receive a subscription request for telemetry information for UE device 110 from application server 160. In response, SCEF 260 or NEF 360 may send a subscription request to a telemetry function for telemetry information associated with UE device 110 and send a subscription request to a subscriber management function for roaming and/or LOC status updates for UE device 110. For example, SCEF 260 may send subscription requests to telemetry function 270 and HSS 250. As another example, NEF 360 may send subscription requests to NWDAF 368 and UDM 352.

Process 700 may further include reporting telemetry information for the UE device to an application server (block 740). For example, SCEF 260 may receive a telemetry report for UE device 110 from telemetry function 270 that includes signal strength and/or quality values associated with UE device 110, load and/or throughput values for base station 120 associated with UE device 110, a congestion alert for UE device 110, latency values for UE device 110, and/or other telemetry KPIs for UE device 110. SCEF 260 may send information based on the received telemetry report to application server 160. As another example, NEF 360 may receive a telemetry report for UE device 110 from NWDAF 368 and send information based on the received telemetry report to application server 160.

Process 700 may further include receiving an indication from the subscriber management function that the UE device has attached to a visited core network (block 750) and subscribing to a visited exposure function of the visited core network for telemetry information for the UE device (block 760). As an example, SCEF 260 may receive an indication from HSS 250 that UE device 110 has attached to, or registered with, visited core network 145 associated with a particular VPLMN ID and may, in response, identify a visited SCEF 260 or NEF 360 for the particular VPLMN ID and send a subscription request to the visited SCEF 260 or NEF 360 for telemetry information associated with UE device 110. As another example, NEF 360 may receive an indication from UDM 352 that UE device 110 has attached to, or registered with, visited core network 145 associated with a particular VPLMN ID and may, in response, identify a visited SCEF 260 or NEF 360 for the particular VPLMN ID and send a subscription request to the visited SCEF 260 or NEF 360 for telemetry information associated with UE device 110.

Process 700 may further include receiving telemetry information for the UE device from the visited exposure function (block 770) and reporting the telemetry information from the visited exposure function to the application server (block 780). For example, SCEF 260 may receive a telemetry report for UE device 110 from the visited SCEF 260 or NEF 360 and send telemetry information for UE device 110 based on the received telemetry report to application server 160. As another example, NEF 360 may receive a telemetry report for UE device 110 from the visited SCEF 260 or NEF 360 and send telemetry information for UE device 110 based on the received telemetry report to application server 160.

Figure 8:
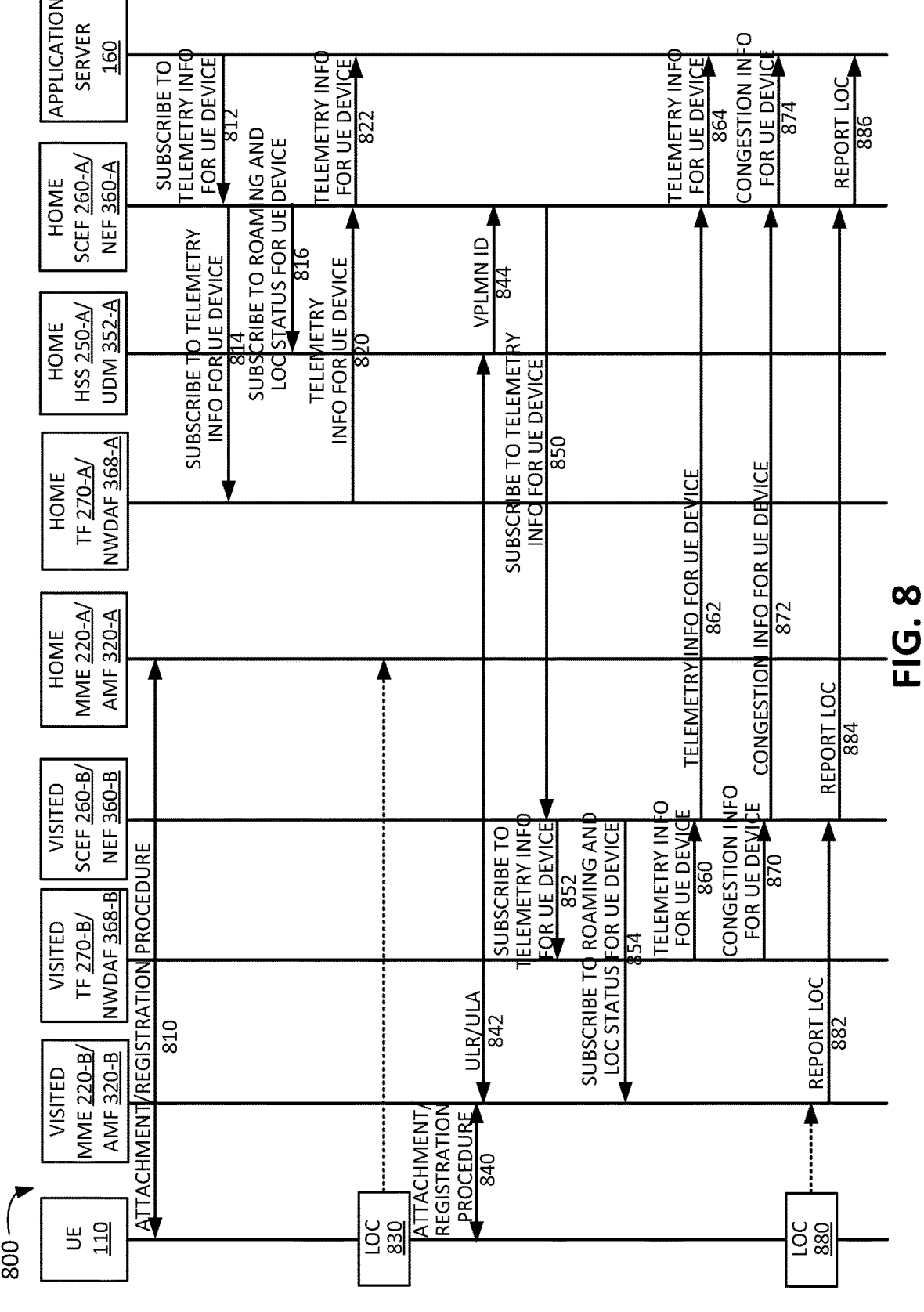
FIG. 8 illustrates an exemplary signal flow diagram according to an implementation described herein.

FIG. 8 illustrates an exemplary signal flow 800 according to an implementation described herein. As shown in FIG. 8, signal flow 800 includes an attachment/registration procedure for UE device 110 with home core network 140 (signal 810). As an example, UE device 110 may attach to home core network 140 via MME 220-A. As another example, UE device may attach to home core network 140 via AMF 320-A. Application server 160 may send a subscription request to a home exposure function to receive telemetry information for UE device 110 (signal 812) and, in response, the exposure function may subscribe for telemetry information for UE device 110 by sending a subscription request to a home telemetry function (signal 814) and subscribe for roaming and/or LOC status for UE device 110 by sending a subscription request for roaming and/or LOC status for UE device 110 to a home subscriber management function (signal 816).

As an example, application server 160 may send a subscription request for telemetry information for UE device 110 to SCEF 260-A via T8 interface 264 and SCEF 260-A may send a subscription request for telemetry information for UE device 110 to telemetry function (TF) 270-A via T9 interface 266 and send a subscription request for roaming and/or LOC status for UE device 110 to home HSS 250-A via S6t interface 268. As another example, application server 160 may send a subscription request for telemetry information for UE device 110 to NEF 360-A via Nnef interface 361 and NEF 3360-A may send a subscription request for telemetry information for UE device 110 to NWDAF 368-A via Nnwdaf interface 369 and send a subscription request for roaming and/or LOC status for UE device 110 to home UDM 352-A via Nudm interface 353.

The home telemetry function may collect telemetry information, such as signal strength and/or quality values for UE device 110, and/or congestion information for base station 120 to which UE device 110 is connected, and report the collected telemetry information to the home exposure function (block 820) and the home exposure function may report the collected telemetry information to application server 160 (block 822). As an example, home telemetry function 270-A may collect telemetry information from base station 120, send the telemetry information to home SCEF 260-A, and SCEF 260-A may forward the collected telemetry information to application server 160. As another example, home NWDAF 368-A may collect telemetry information from base station 120, send the telemetry information to home NEF 360-A, and NEF 360-A may forward the collected telemetry information to application server 160.

At a later time, UE device 110 may leave the coverage area of home core network 140 and experience a LOC (block 830). Home core network 140 may detect the LOC and store information indicating the LOC in a subscriber management function. The subscriber management function may report the LOC to the home exposure function and the home exposure function may report the LOC to application server 160 (not shown in FIG. 8). UE device 110 may then be in the coverage area of visited core network 145 and may attach to, or register with, visited core network 145 (signal 840). As an example, UE device 110 may attach to visited core network

145 via visited MME 220-B. As another example, UE device 110 may attach to visited core network 145 via visited AMF 320-B.

After UE device 110 attaches to, or registers with, visited core network 145, visited core network 145 may inform home core network 140 of the attachment or registration by sending an updated location request (ULR) to a subscriber management function in home core network 140 and receiving acknowledgement in the form of an updated location answer (ULA) (signal 842). As an example, home HSS 250-A may receive a ULA from visited MME 220-B or AMF 320-B and respond with a ULA. As another example, home UDM 352-A may receive a ULA from visited MME 220-B or AMF 320-B and respond with a ULA.

The subscriber management function may update a subscriber record for UE device 110 with information identifying the current or last known location of UE device 110 and information identifying visited core network 145, such as the VPLMN ID of visited core network 145. The home subscriber management function may determine that the home exposure function has subscribed for roaming and/or LOC status for UE device 110 and may, in response, send a notification to the home exposure function with information identifying visited core network 145, such as the VPLMN ID of visited core network 145 (signal 844). As an example, home HSS 250-A may send a notification with the VPLMN ID to home SCEF 260-A. As another example, home UDM 352-A may send a notification with the VPLMN ID to home NEF 360-A.

In response, the home exposure function may send a subscription request to the visited exposure function of visited core network 145 for telemetry information for UE device 110 (signal 850), and the visited exposure function may send a subscription request to the visited telemetry function to receive telemetry information for UE device 110 (signal 852) and send a subscription request to a visited subscriber management function (signal 854). As an example, home HSS 250-A may send a subscription request to visited SCEF 260-B or visited NEF 360-B. As another example, home UDM 352-A may send a subscription request to visited SCEF 260-B or visited NEF 360-B. Visited SCEF 260-B or visited NEF 360-B may then send a subscription request to visited telemetry function 270-B or visited NWDAF 368-B and send a subscription request to visited HSS 250 or visited UDM 352 either directly (not shown in FIG. 8) or via visited MME 220-B or visited AMF 320-B.

The visited telemetry function may collect telemetry information, such as signal strength and/or quality values for UE device 110 and report the collected telemetry information to the visited exposure function (block 860). The visited exposure function may then forward the collected telemetry information to the home exposure function (signal 862) and the home exposure function may report the collected telemetry information to application server 160 (block 864). As an example, visited telemetry function 270-B or visited NWDAF 368-B may send telemetry information to visited SCEF 260-B or visited NEF 360-B; visited SCEF 260-B or visited NEF 360-B may forward the telemetry information to home SCEF 260-A; and home SCEF 260-A may report the telemetry information to application server 160. As another example, visited telemetry function 270-B or visited NWDAF 368-B may send telemetry information to visited SCEF 260-B or visited NEF 360-B; visited SCEF 260-B or visited NEF 360-B may forward the telemetry information to home NEF 360-A; and home NEF 360-A may report the telemetry information to application server 160.

The visited telemetry function may determine congestion information for base station 120 to which UE device 110 is connected and report the congestion information to the visited exposure function (block 870). The visited exposure function may then forward the congestion information to the home exposure function (signal 872) and the home exposure function may report the congestion information to application server 160 (block 874). As an example, visited telemetry function 270-B or visited NWDAF 368-B may send congestion information to visited SCEF 260-B or visited NEF 360-B; visited SCEF 260-B or visited NEF 360-B may forward the congestion information to home SCEF 260-A; and home SCEF 260-A may report the congestion information to application server 160. As another example, visited telemetry function 270-B or visited NWDAF 368-B may send congestion information to visited SCEF 260-B or visited NEF 360-B; visited SCEF 260-B or visited NEF 360-B may forward the congestion information to home NEF 360-A; and home NEF 360-A may report the congestion information to application server 160.

At a later time, UE device 110 may leave the coverage area of visited core network 145 and experience a LOC (block 880). Visited core network 145 may detect the LOC and store information indicating the LOC in a visited subscriber management function. The visited subscriber management function may report the LOC to the visited exposure function (signal 882); the visited home exposure function may forward the report of the LOC to the home subscriber function (signal 884); and the home exposure function may report the LOC to application server 160 (signal 886). Visited HSS 250 or visited UDM 352 may send either the report of LOC directly to visited telemetry function 270-B or visited NWDAF 268-B (not shown in FIG. 8) or via visited MME 220-B or visited AMF 320-B. Visited telemetry function 270-B or visited NWDAF 368-B may send the report of LOC to visited SCEF 260-B or visited NEF 360-B. As an example, visited SCEF 260-B or visited NEF 360-B may forward the report of LOC to home SCEF 260-A; and home SCEF 260-A may report the LOC to application server 160. As an example, visited SCEF 260-B or visited NEF 360-B may forward the report of LOC to home SCEF 260-A; and home NEF 360-A may report the LOC to application server 160.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks have been described with respect to FIG. 7, and a series of signals have been described with respect to FIG. 8, the order of the blocks, and/or signals, may be modified in other implementations. Further, non-dependent blocks and/or signals may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/ "comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store, or employ personal information of individuals, it should be understood that such information shall be collected, stored, and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:

receiving, by a device in a core network associated with a Radio Access Network (RAN), an indication from a subscriber management device that a user equipment (UE) device has attached to a second core network;

subscribing, by the device, with a second network exposure device in the second core network to receive telemetry information notifications for the UE device, in response to receiving the indication;

receiving, by the device, a telemetry information notification for the UE device from the second network exposure device; and reporting, by the device, telemetry information obtained from the received telemetry information notification to a server device associated with the UE device.

2. The method of claim 1, wherein subscribing to receive the telemetry information includes:

sending a subscription request to the second network exposure device via an interface.

3. The method of claim 1, wherein reporting the telemetry information obtained from the received telemetry information notification to the server device associated with the UE device includes:

sending a telemetry report to the server device via an interface.

4. The method of claim 1, further comprising:

subscribing with a telemetry device in the core network to receive telemetry information notifications for the UE device; and reporting telemetry information notifications for the UE device from the telemetry device to the server device.

5. The method of claim 4, wherein subscribing with a telemetry device in the core network to receive telemetry information notifications for the UE device includes:

sending a subscription request to the telemetry device via a T9 interface.

6. The method of claim 1, further comprising:

subscribing with the subscriber management device to receive roaming status notifications for the UE device; and reporting roaming status notifications for the UE device received from the subscriber management device to the server device.

7. The method of claim 1, wherein the telemetry information notification for the UE device includes at least one of:

a signal strength or a signal quality parameter value for the UE device.

8. The method of claim 1, wherein the telemetry information notification for the UE device includes at least one of:

congestion information for a connection associated with the UE device; and a loss of connection information for a connection associated with the UE device.

9. The method of claim 1, wherein the core network is part of a home network and the second core network is part of a visited network.

10. The method of claim 1, wherein the device includes a first Service Capabilities Exposure Function (SCEF) in the core network, and wherein the second network exposure device includes a second SCEF device.

11. The method of claim 1, wherein the device includes a first Network Exposure Function (NEF) in the core network, and wherein the second network exposure device includes a second NEF device.

12. A device comprising:

a processor configured to:

receive an indication from a subscriber management device that a user equipment (UE) device has attached to a second core network, wherein the device is in a core network associated with a Radio Access Network (RAN);

subscribe with a second network exposure device in the second core network to receive telemetry information notifications for the UE device, in response to receiving the indication;

receive a telemetry information notification for the UE device from the second network exposure device; and report telemetry information obtained from the received telemetry information notification to a server device associated with the UE device.

13. The device of claim 12, wherein, when subscribing to receive the telemetry information notifications for the UE device, the processor is further configured to:

send a subscription request to the second network exposure device via an interface.

14. The device of claim 12, wherein, when reporting the telemetry information obtained from the received telemetry information notification to the server device associated with the UE device, the processor is further configured to:

send a telemetry report to the server device via an interface.

15. The device of claim 12, wherein the processor is further configured to:

subscribe with a telemetry device in the core network to receive telemetry information notifications for the UE device by sending a subscription request to the telemetry device via an interface; and report telemetry information notifications for the UE device from the telemetry device to the server device.

16. The device of claim 12, wherein the processor is further configured to:

subscribe with the subscriber management device to receive roaming status notifications for the UE device; and report roaming status notifications for the UE device from the subscriber management device to the server device.

17. The device of claim 12, wherein the telemetry information notification for the UE device includes at least one of:

a signal strength or quality parameter value for the UE device;

congestion information for a connection associated with the UE device; or loss of connection information for a connection associated with the UE device.

18. The device of claim 12, wherein the device includes a first Service Capabilities Exposure Function (SCEF) in the core network, and wherein the second network exposure device includes a second SCEF device.

19. The device of claim 12, wherein the device includes a first Network Exposure Function (NEF) in the core network, and wherein the second network exposure device includes a second NEF device.

20. A non-transitory computer-readable memory device storing instructions executable by a processor, the non-transitory computer-readable memory device comprising:

one or more instructions to receive an indication from a subscriber management device that a user equipment (UE) device has attached to a second core network, wherein the device is in a core network associated with a Radio Access Network (RAN);

one or more instructions to subscribe with a second network exposure device in the second core network to receive telemetry information notifications for the UE device, in response to receiving the indication;

one or more instructions to receive a telemetry information notification for the UE device from the second network exposure device; and one or more instructions to report telemetry information obtained from the received telemetry information notification to a server device associated with the UE device.

* * * * *